United States Patent [19]
Kilian et al.

[11] Patent Number: 5,682,430
[45] Date of Patent: Oct. 28, 1997

[54] SECURE ANONYMOUS MESSAGE TRANSFER AND VOTING SCHEME

[75] Inventors: Joseph John Kilian, Princeton Junction, N.J.; Kazue Sako, Kawasaki, Japan

[73] Assignee: NEC Research Institute, Inc., Princeton, N.J.

[21] Appl. No.: 376,568

[22] Filed: Jan. 23, 1995

[51] Int. Cl.[6] .................... H04L 9/30; G06F 17/60
[52] U.S. Cl. .................. 380/30; 380/28; 364/404
[58] Field of Search ................... 380/28, 30, 42; 364/409; 395/933

[56] References Cited

U.S. PATENT DOCUMENTS

| | | | |
|---|---|---|---|
| 5,495,532 | 2/1996 | Kilian et al. | 380/30 |
| 5,521,980 | 5/1996 | Brands | 380/30 |

*Primary Examiner*—Gilberto Barrón, Jr.
*Attorney, Agent, or Firm*—Philip J. Feig

[57] ABSTRACT

A number-theoretic based algorithm provides for secure anonymous message transfer and electronic voting. A voter or sender may cast an encrypted vote or message that is processed through n centers in a manner which prevents fraud and authenticates the votes. Any interested party can verify that each vote has been properly counted. The invention can be realized by current-generation personal computers with access to an electronic bulletin board.

34 Claims, 3 Drawing Sheets

SECURE ANONYMOUS MESSAGE TRANSFER AND VOTING SCHEME

FIELD OF INVENTION

The present invention relates to secure anonymous message transfer and specifically, to number-theoretic methods and apparatus for secure electronic voting.

BACKGROUND OF THE INVENTION

Secure electronic voting is one of the most important applications of secure multiparty computation. Yet despite extensive work on this subject, no complete solution has been found in either the theoretical or practical domains. Even the general solutions to secure multi-party protocols fail to exhibit all of the desired security properties of elections.

A number of more practical voting protocols have been proposed, with widely differing security properties. Schemes based on anonymous channels/mixers have become very popular due to their superior efficiency and the arbitrary nature of the votes that are allowed.

Mix-net anonymous channels were first proposed by D. Chaum in an article entitled "Untraceable Electronic Mail, Return Address, and Digital Pseudonyms" in Communication of the ACM, ACM, 1981, pp 84 to 88. Subsequently, many voting schemes have been proposed based on this basic technique as in an article by A. Fujioka et al, entitled "A Practical Secret Voting Scheme for Large Scale Elections," in Advances in Cryptology—Auscrypt '92, 1992, pp. 244 to 251, and in an article by C. Park et al, entitled "All/Nothing Election Scheme and Anonymous Channel" in Advances in Cryptology, Eurocrypt '93, 1993, pp. 248 to 259.

These schemes are efficient, but have the following shortcomings. The simplest of these schemes does not allow a voter to securely protest the omission of a vote without allowing a malicious voter to block the election. After the election, each voter is typically responsible for checking that their vote was correctly tallied. There is usually no way for an outside observer to later verify that the election was properly performed. Furthermore, some anonymous channels are vulnerable to an attack as described in an article by B. Pfitzmann entitled "Breaking an efficient anonymous channel" in Eurocrypt '94 Proceedings, 1994, pp. 339 to 348.

In accordance with the teachings of the present invention, a secure anonymous channel and a voting scheme are described in which an outside observer can verify that the election was indeed performed correctly. Therefore omission of a vote can be detected by anyone, without fear of a malicious voter blocking the election. Furthermore, the present invention also helps thwart an attack proposed by B. Pfitzmann, supra.

SUMMARY OF THE INVENTION

A secure anonymous channel is described where multiple messages to a same destination are tranferred securely though multiple mixing centers. If the messages to be sent are votes where the destination is a vote-counting center and the first mixing center accepts messages of valid voters, then this scheme becomes a secure voting scheme. The present invention generally refers to an anonymous message transfer scheme where secure electronic voting is a practical application of the more general invention.

In the scheme, encrypted messages from the senders are successively processed by the mixing centers until the last center outputs a randomly, untraceably ordered set of unencrypted messages. That is, the encryptions used for the anonymous channel have been stripped off or decrypted. At a high level, the senders first post their encrypted messages. mixing center i processes each message posted by mixing center i−1 (or the senders, when i=1) and posts the results in permuted order.

A three-step procedure is followed by each mixing center i. The first step is posting decrypted results of each input message. The second step is mixing the results and posting them in permuted order. The third step is proving that the centers correctly executed the first and second steps. The Fiat-Shamir technique as discussed in an article entitled "How to Prove Yourself: Practical Solutions to identification and signature problems" in Advances in Cryptology—Crypto '86, Springer-Verlag, 1986, pp. 186 to 199, can be used to make the above proofs non-interactive.

At the conclusion of the three step process or at a later time, any interested party can check the resulting proofs to confirm that the messages have all been handled correctly. With this method for achieving universal verifiability there is no need for adding redundancy to the messages.

Also, the invention results in a method which reduces the amount of communication and computation necessary to generate, transmit and check the proofs by combining multiple proofs into a single proof.

The present invention will be best understood when the following description is read in conjunction with the accompanying drawing.

DETAILED DESCRIPTION OF THE INVENTION

Figure 1:
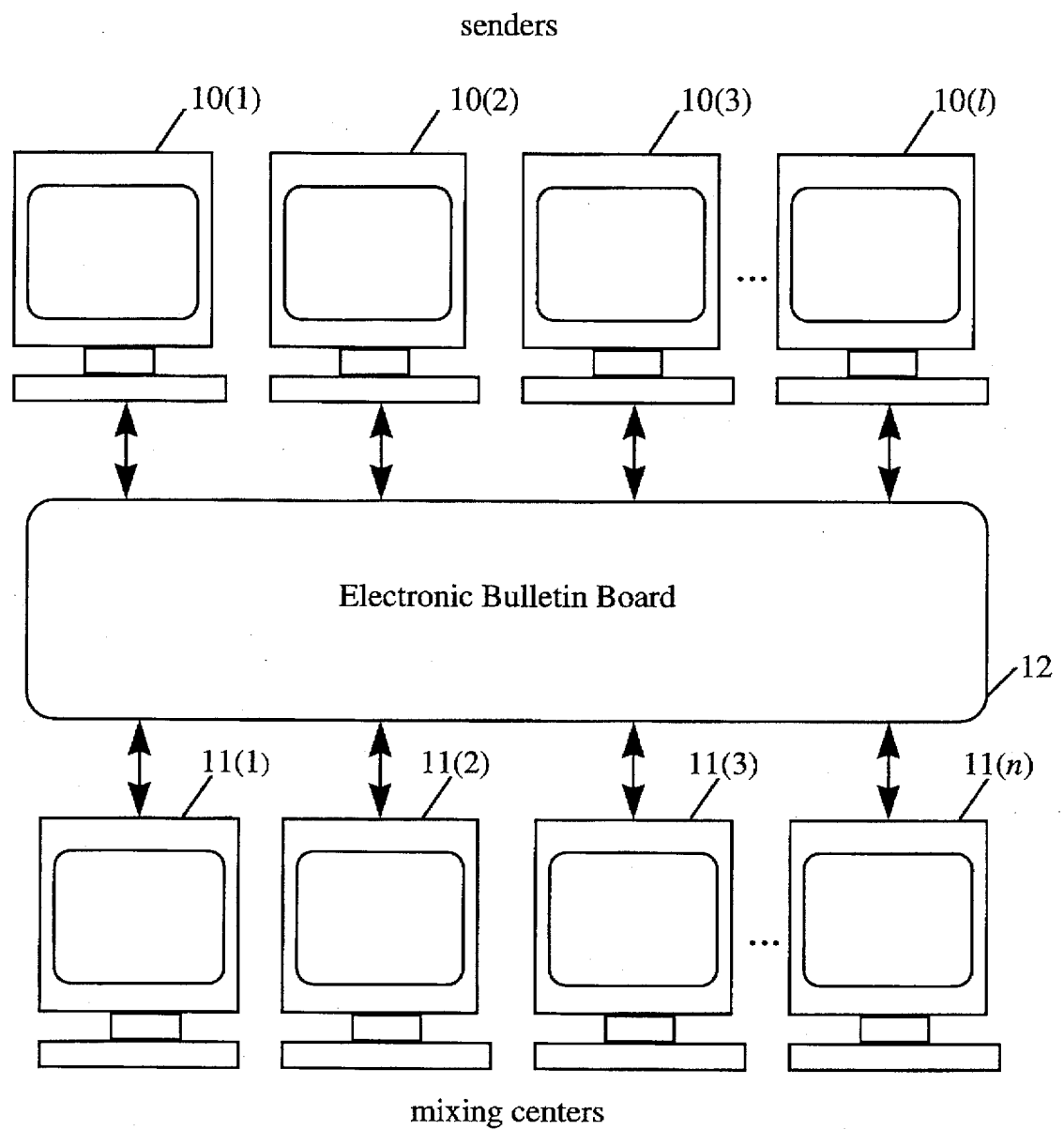
FIG. 1 is a schematic illustration of a preferred embodiment for practicing the present invention.

The anonymous message transfer scheme comprising the present invention will now be described with reference to FIGS. 1 and 2. In accordance with the scheme, encrypted messages from senders $10(1)$, $10(2)$, $10(3)$ ... $10(l)$ are successively processed by the mixing centers $11(1)$, $11(2)$, $11(3)$ ... $11(n)$ until the last center provides as its output a randomly, untraceably ordered set of unencrypted messages. Voters cast their ballot by means of a sender which comprises a computing means, preferably a personal computer but it may also be a workstation or the like. Similarly, each mixing center comprises a computing means, preferably a personal computer, a workstation or the like. The senders first post their encrypted messages preferably on an electronic bulletin board or other publicly available messaging means. Mixing center $11(i)$ processes each message posted by the previous mixing center $11(i-1)$ (or the senders $10$, when i=1) and posts the results in permuted order until the last mixing center $11(n)$ posts the result or tally of the voting. Having set forth an overview of the scheme, the detail of how a message m is initially encrypted by a sender and how a mixing center $11(i)$ processes each message will now be described in detail.

Initially, entities participating in the voting, i.e. the senders and the mixing centers, need to agree on using prime numbers p and q where the following relationships exist for some integer k:

$p=kq+1$.

The value g' is a generator mod p and g is equal to $$g=(g')^k \bmod p.$$

Assume there are n mixing centers. Each mixing center $11(i)$ generates a integer $x_i \in Z_{qp}^*$ and publishes $$y_i = g^{x_i} \bmod p$$

as its public key and keeps $x_i$ as its secret key. For the purpose of simplification, $w_i$ will represent the product $y_{i+1}y_{i+2} \ldots y_n$ and $w_n=1$.

The message from a sender 10 is m. The sender generates a random number $r_0$, and posts $$(G_1, M_1) = (g^{r_0} \bmod p, (w_0)^{r_0} \cdot m \bmod p)$$

for use by mixing center 11(1).

For ease of explanation, the three steps of decrypt, shuffle and prove of the centers will be described in this order. However, implementation does not necessarily require the steps to be performed in this order.

In response to input $(G_i, M_i)$, mixing center 11 $i$ ($i=1, \ldots, n-1$) generates a random number $r_i$ (independently for each message-pair) and calculates the following values using the secret key $x_i$:

$$\begin{aligned}
G_{i+1} &= G_i \cdot g^{r_i} \bmod p \\
&= g^{r_0 + \ldots + r_i} \bmod p \\
H_{i+1} &= G_i^{x_i} \bmod p \\
M_{i+1} &= M_i \cdot \omega_i^{r_i}/H_{i+1} \bmod p \\
&= \omega_i^{r_0 + \ldots + r_i} \cdot m \bmod p
\end{aligned}$$

and posts $(H_{i+1})$ corresponding to $(G_i, M_i)$. The value $(G_{i+1}, M_{i+1})$ is posted, permuted with the other processed messages for use by mixing center 11 (i+1).

The mixing center $11(i)$ executes a prove-DECRYPT algorithm for inputs $(G_i, g, y_i, H_{i+1})$. The description of the algorithm prove-DECRYPT is given in below. Execution of this algorithm proves that mixing center $11(i)$ generated $H_{i+1}$ correctly. Mixing center $11(i)$ then executes a prove-SHUFFLE algorithm, a description of which is given below. Execution of this algorithm proves that the mixing center shuffled honestly.

Mixing center $11(n)$ recovers m from input $(G_i, M_i)$ by computing:

$$m = M_n / G_n^{x_n} \bmod p.$$

The mixing center $11(n)$ then executes the prove-DECRYPT algorithm for inputs $(G_n, g, y_n, M_n/m)$.

The algorithms prove-DECRYPT and prove-SHUFFLE will now be described. The algorithms involve a prover and a verifier. The verifier may be a random beacon or an output of a suitable hash function, as is described below.

In order to describe the algorithm prove-DECRYPT, the first phase of the protocol is abstracted as follows. Given G, the first step comprises performing decryption in order to generate $H=G^x \bmod p$. The proof comprises, given $(G, g, y= g^x \bmod p, H)$, showing that H is generated in this manner from G. The algorithm is as follows:

prove-DECRYPT

1. The prover uniformly chooses $r \in Z_{p-1}$.

Let $y' = g^r \bmod p$ $G' = G^r \bmod p$.

The prover sends (y', G').

2a. With probability ½, the verifier asks the prover to reveal r. The verifier checks that y' and G' are consistent with r.

2b. With probability ½, the verifier asks the prover to reveal $r'=r-x$. The verifier checks that $y' = g^{r'} \cdot y \bmod p$ and $G' = H \cdot G^{r'} \bmod p$.

end of algorithm

In order to describe the algorithm prove-SHUFFLE, the second step is abstracted as follows.

Given constants g, w and $$A = \begin{pmatrix} a_i^{(1)} \\ a_i^{(2)} \end{pmatrix},$$

the second step comprises generating $r_1, r_2, \ldots$ and a permutation $\pi$ and generating a set of pairs $$B = \begin{pmatrix} a_{\pi(i)}^{(1)} \cdot g^{r_{\pi(i)}} \bmod p \\ a_{\pi(i)}^{(2)} \cdot \omega^{r_{\pi(i)}} \bmod p \end{pmatrix}.$$

Here $a_i^{(1)}$ refers to G's and $a_i^{(2)}$ refers to M/H's in the first step. The proof comprises, given (A, B, g, w), showing that B could be generated in this manner from A. The algorithm is as follows:

prove-SHUFFLE

1. The prover uniformly chooses $t \in Z_{p-1}$, random permutation $\gamma$ and $$C = \begin{pmatrix} a_{\lambda(i)}^{(1)} \cdot g^{t\lambda(i)} \bmod p \\ a_{\lambda(i)(2)} \cdot \omega^{t\lambda(i)} \bmod p \end{pmatrix}.$$

The prover sends C.

2a. With probability ½, the verifier asks the prover to reveal $\gamma$ and $t_i$. The verifier checks that C is consistent with A, $\gamma$, $t_i$ in that way. 2b. With probability ½, the verifier asks the prover to reveal $\gamma' = \gamma \circ \pi^{-1}$ and $t_i' = t_i - r_i$. The verifier checks that C can be generated from B in the following way:

For $B = \begin{pmatrix} b_i^{(1)} \\ b_i^{(2)} \end{pmatrix}$, $C = \begin{pmatrix} b_{\lambda'(i)}^{(1)} \cdot g^{t'\lambda'(i)} \bmod p \\ b_{\lambda'(i)(2)} \cdot \omega^{t'\lambda'(i)} \bmod p \end{pmatrix}$ holds.

End of algorithm

Each execution of the algorithms prove-DECRYPT or prove-SHUFFLE finds a cheating prover with probability ½.

In order to raise this probability closer to 1, independent executions are necessary.

While these algorithms are given in terms of a verifier, a more efficient solution is to use the Fiat-Shamir method of eliminating interaction. First, the protocol is run many times (on the order of 40 or 60) in order to make the probability of withstanding all of the challenges exceedingly small. Then the verifier is replaced by a suitably "random looking" hash function which generates the challenges from the prover's posting in Step 1 of the algorithms prove-DECRYPT or prove-SHUFFLE. This heuristic of Fiat-Shamir method is described in an article entitled "How to Prove Yourself: Practical solutions to identification and signature problems" in Advances in Cryptology—Crypto '86, Springer-Verlag, 1986, pp. 186 to 199. This way the prover can send all the messages to the verifier in a single message. This message is posted for public access.

The bulk of the computation and communication required to execute algorithm prove-DECRYPT for each of the messages from previous centers can reduced. By combining many of the proofs into a single proof, the centers can efficiently prove they decrpyted all of the inputs correctly.

It is necessary to show that the following equation holds for each pair $(G^{(j)}, H^{(j)})$.

$$H^{(j)} = (G^{(j)})^x \bmod p$$

The above equations are reduced to the following single equation using randomly chosen coefficients $c_j$:

$$\prod_i (H^{(j)})^{c_j} = \prod_i ((G^{(j)})^{c_j})^x \bmod p$$

A center can execute the above protocol where $G = \prod_i (G^{(j)})^{c_j}$ and $H = \prod_i (H^{(j)})^{c_j}$. Advantage is made of the fact that if one or more of the original equations is wrong, then if the coefficients are chosen randomly, the final equation will also be wrong with high probability. These random coefficients must not be chosen by the prover, but should be provided by a verifier, beacon or as the output of a suitable hash function.

Similarly, as a variation of the above scheme, the following two round anonymous channel can be constructed. In the two round anonymous channel, each mixing center $11(i)$, on inputs $(G_i, M_i)$ first shuffles the inputs to $(G_i \cdot g^a \bmod p, M_i \cdot w_0^a \bmod p)$ and passes the shuffled values in a random order to the next center. Each center executes the prove-SHUFFLE algorithm (with some constants fixed to this scheme) to prove the correctness of the information. When the shuffled messages are finally provided to the mixing center $11(n)$, mixing center $11(n)$ publishes $G_{n+1}$ and $M_{n+1}$ for each message. Then each mixing center $11(i)$ publishes $H_{i=G_{n+1}}{}^{x_i}$. The mixing center $11(i)$ executes the prove-DECRYPT algorithm with input $(G_{n+1}, g, H_i)$ to prove the correctness. The message m can be recovered by $M_{n+1}/\prod H_i$.

In order to avoid vote-duplication attack, each sender may sign and encrypt the message to be posted. That is, the sender may sign the output of a message to be posted. By signing the output of a message constructor (described below) and then encrypting the message using the public key of the first center $11(1)$, a malicious sender cannot copy another sender's message, since the copied message would not have the correct signature. Moreover, the message is encrypted in a manner such that the message cannot be decrypted, nor can a different signature be affixed to the encrypted message.

Alternatively, the first center may conceal all of the message from the senders until each sender has posted a note or message.

In order to prevent the first center $11(1)$ and a malicious sender from conspiring, it is possible to use a conventional secure commitment scheme such as that discussed in an article by M. Naor, entitled "Bit commitment using pseudo-randomness," in Advances in Cryptology—CRYPTO '89, 1989, pp. 128 to 136.

Having described a preferred method of practicing the present invention, preferred embodiments useful for practicing the invention will now be described.

FIG. 1 schematically illustrates a preferred embodiment for practicing the invention. The senders $10(1), 10(2), 10(3), \ldots 10(l)$ and mixing centers $11(1), 11(2), 11(3) \ldots 11(n)$ use personal computers or workstations connected to a conventional electronic bulletin board 12. All parties (senders, verifiers, centers and the like) to the message transfer process interact by posting messages to and receiving messages from the bulletin board. Senders can also serve as centers. The personal computers either contain software to perform the method described above or alternatively contain in hardware or software embodiments of the elements described in FIG. 2.

Figure 2:
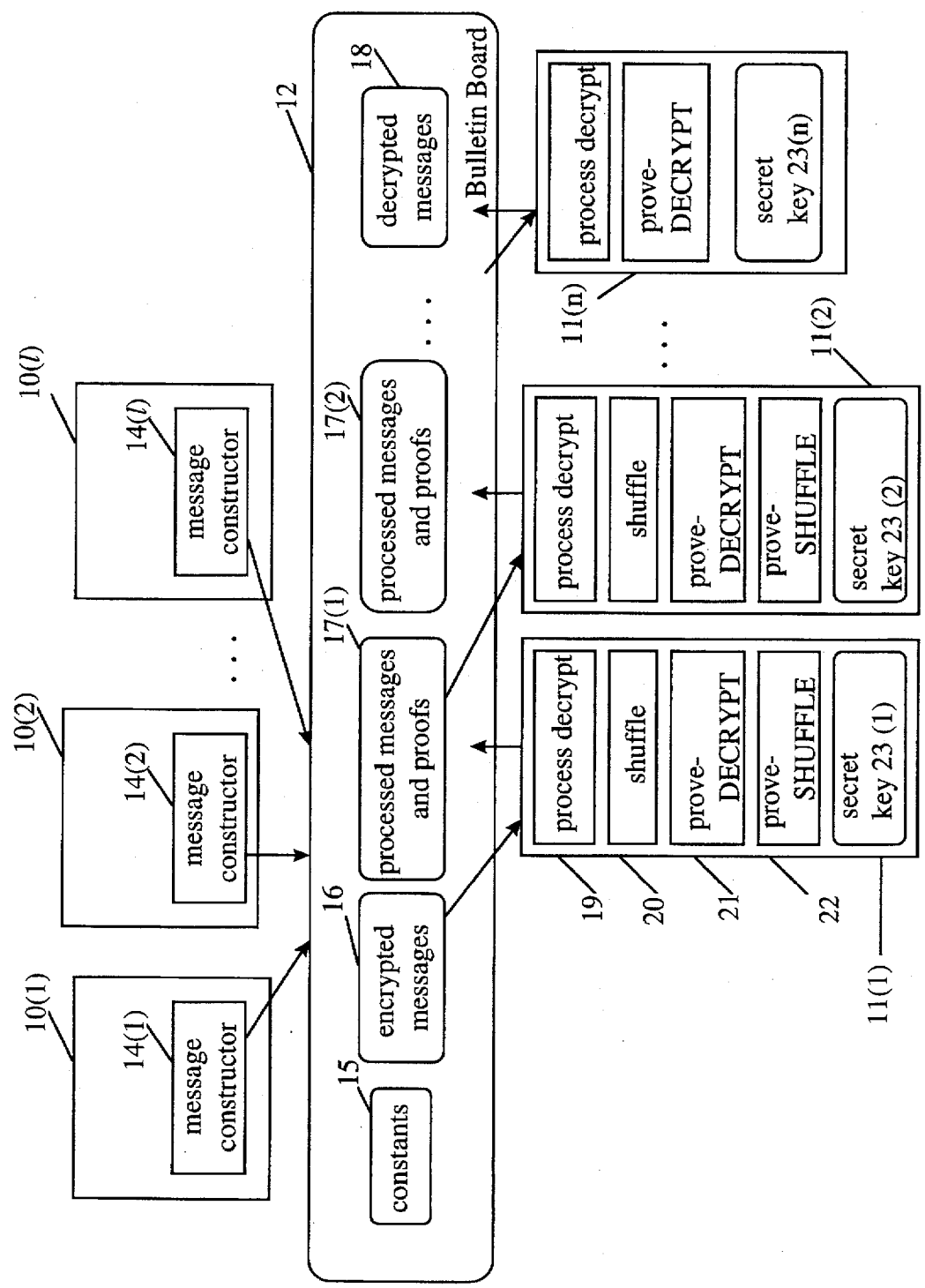
FIG. 2 is a schematic illustration of message flow.
Figure 3:
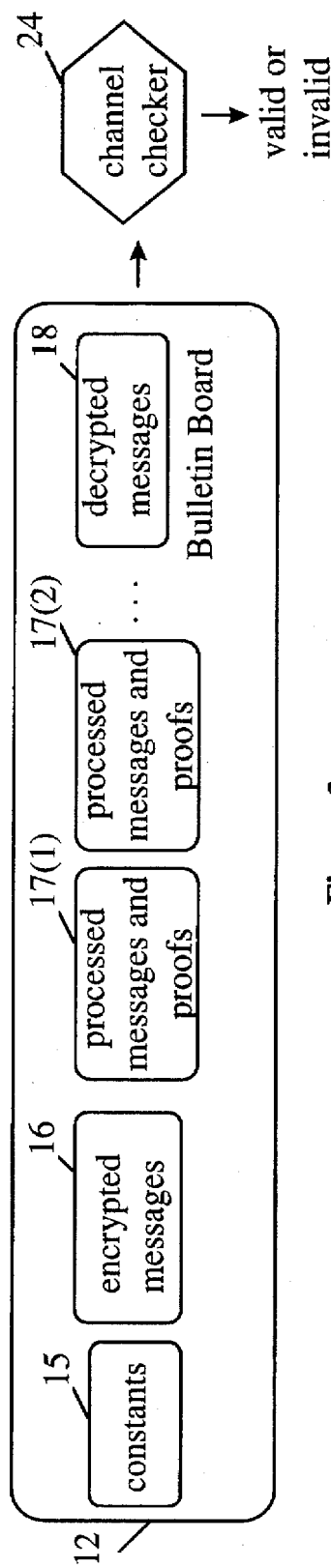
FIG. 3 is a schematic illustration of a channel checker.

FIG. 2 illustrates how messages are anonymously transferred. Each message constructor $14(1), 14(2), 14(3) \ldots 14(l)$ of message sender $10(1), 10(2), 10(3) \ldots 10(l)$ generates an encrypted message $16(1), 16(2), 16(3), \ldots 16(l)$, using constants 15 as described above. The encrypted messages 16 are posted to the electronic bulletin board 12. Then each mixing center $11(i)$ reads as its input, message $17(i-1)$ from the bulletin board 12. (mixing center $11(1)$ reads the encrypted message 16.) The mixing center then follows the sequence process decrypt 19, shuffle 20, prove-DECRYPT 21, prove-SHUFFLE 22 using its secret key $23(i)$ as described above. The processed messages and proofs $17(i)$ are posted to the electronic bulletin board. (Mixing center $11(n)$ posts decryted messages 18.) In the case of electronic voting, mixing center $11(n)$ will post a tally of the votes FIG. 3 schematically illustrates a channel checker 24. The channel checker 24 receives constants 15, encrypted messages 16, a set of processed messages and proofs $17(1), 17(2) \ldots$ and decrypted messages 18 and determines whether the message transfer was processed as specified above, thus indicating a valid or invalid channel. That is, the channel checker includes a verifier for the proofs given by the mixing centers.

Figure 4:
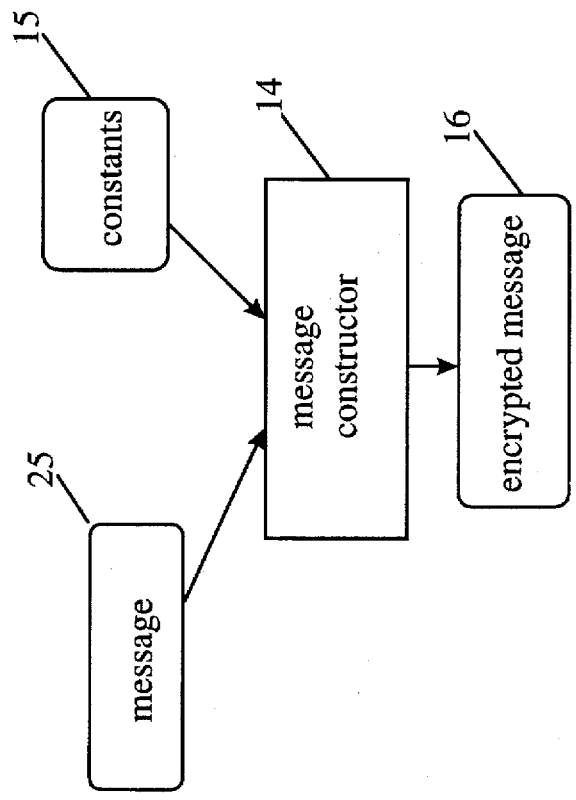
FIG. 4 is a schematic illustration of a message constructor.

FIG. 4 illustrates a message constructor 14. The message constructor 14 generates encrypted message 16 for the message 25 using constants 15 as described above.

While there has been described and illustrated a preferred method and apparatus of secure anonymous message transfer and electronic voting, it will be apparent to those skilled in the art that variations and modifications are possible without deviating from the broad teachings and spirit of the present invention which shall be limited solely by the scope of the claims appended hereto.

What is claimed is:

1. A method of secure anonymous message transfer from a plurality of senders by use of a plurality of mixing centers comprising the steps of:

(a) choosing constants which are posted for senders $S_1, S_2, \ldots S_I$ and mixing centers, $C_1, C_2, \ldots C_n$;

(b) each sender $S_k$ constructing an encrypted message which is posted;

(c) a first mixing center $C_1$ processing the posted messages from each sender $S_k$ which processed messages are then posted for use by the next center;

(d) each mixing center $C_2$ through $C_{n-1}$ sequentially processing the processed messages from the previous center, which sequentially processed messages are then posted for use by the next center;

(e) the last mixing center $C_n$ processing messages from the previous center $C_{n-1}$ and posting the result;

(f) each mixing center proving the validity of its processing, which proof is posted; and (g) channel checker verifying correctness of the execution from posted messages when necessary.

2. A method of secure anonymous message transfer as set forth in claim 1, where steps (c), (d) and (e) further comprises:

(h) providing each mixing center with a secret key; and (i) said processing including using the secret key of a respective mixing center.

3. A method of secure anonymous message transfer as set forth in claim 2, where said proving comprises executing algorithm prove-DECRYPT.

4. A method of secure anonymous message transfer as set forth in claim 3, where said proving further comprises executing algorithm prove-SHUFFLE.

5. A method of secure anonymous message transfer as set forth in claim 3, where said executing algorithm prove-DECRYPT is executed for multiple messages together.

6. A method of secure anonymous message transfer as set forth in claim 2, where said proving comprises applying the Fiat-Shamir method.

7. A method of secure anonymous message transfer as set forth in claim 2, further comprising (j) shuffling the messages.

8. A method of secure anonymous message transfer as set forth in claim 1, where steps (c), (d), and (e) further comprises shuffling the messages.

9. A method of secure anonymous message transfer as set forth in claim 8, where after the last mixing center $C_n$ posts the result, each mixing center executes algorithm prove-DECRYPT using the result.

10. A method of secure anonymous message transfer as set forth in claim 8, further comprising providing each mixing center with a secret key and where after the last mixing center $C_n$ posts the result, each mixing center performs said processing using its respective secret key and the result.

11. A method of secure anonymous message transfer as set forth in claim 8, where said proving comprises executing algorithm prove-SHUFFLE.

12. A method of secure anonymous message transfer as set forth in claim 11, where said proving comprises applying the Fiat-Shamir method.

13. A method of secure anonymous message transfer as set forth in claim 8, where said proving comprises applying the Fiat-Shamir method.

14. A method of secure anonymous message transfer as set forth in claim 1, where said proving comprises applying the Fiat-Shamir method.

15. A method of secure anonymous message transfer as set forth in claim 1, where in step (b) each sender $S_k$ posts its encrypted message substantially simultaneously.

16. A method of secure anonymous message transfer as set forth in claim 1, where in step (b) each sender $S_k$ constructs its encrypted message using a key of said first mixing center $C_1$ and said encrypted message includes a signature of a respective sender $S_k$.

17. A method of secure anonymous message transfer as set forth in claim 1, where in step (b) each sender $S_k$ constructs an encrypted message which is publicly revealed after said first mixing center $C_1$ receives a respective encrypted message.

18. A method of secure anonymous message transfer as set forth in claim 1, said first mixing center $C_1$ processing only legitimate messages and processing only one message from each sender.

19. A method of secure anonymous message transfer as set forth in claim 18, where said senders are voters and said messages are votes.

20. A method of secure anonymous message transfer as set forth in claim 19, where said processing of said last mixing center $C_n$ comprises computing a tally.

21. An apparatus for secure anonymous message transfer comprising:

a bulletin board having constants;

a plurality of senders, $S_1, S_2, \ldots, S_l$, each sender $S_k$ constructing an encrypted message using the constants and posting said encrypted message to said bulletin board;

a plurality of mixing centers, $C_1, C_2, \ldots, C_n$, a first mixing center $C_1$ processing the posted messages from each sender using the constants and posting a processed message to said bulletin board for use by the next mixing center, each mixing center $C_2$ through $C_{n-1}$ sequentially processing the processed message from the previous mixing center using the constants and posting a further processed message to said bulletin board for use by the next mixing center, the last mixing center $C_n$ processing messages from the previous center $C_{n-1}$ using the constants and posting the result on said bulletin board;

means associated with each respective mixing center for proving the validity of the processing of the respective mixing center, which proof is posted on said bulletin board; and channel checking means for verifying the correctness of execution from posted messages.

22. An apparatus for anonymous message transfer as set forth in claim 21, further comprising secret key means associated with each respective mixing center for providing a secret key to said respective mixing center for processing messages.

23. An apparatus for anonymous message transfer as set forth in claim 22, where said mixing center processes messages by executing algorithm prove-DECRYPT.

24. An apparatus for anonymous message transfer as set forth in claim 23, where each said means associated with each respective mixing center executes algorithm prove-DECRYPT.

25. An apparatus for anonymous message transfer as set forth in claim 24, where each means associated with each respective mixing center executes algorithm prove-DECRYPT for multiple messages.

26. An apparatus for anonymous message transfer as set forth in claim 21, where said mixing center processes messages by shuffling messages.

27. An apparatus for anonymous message transfer as set forth in claim 26, where said mixing centers process messages by executing algorithm prove-SHUFFLE.

28. An apparatus for anonymous message transfer as set forth in claim 26, where each said means associated with each respective mixing center executes algorithm prove-SHUFFLE.

29. An apparatus for anonymous message transfer as set forth in claim 21, where each sender $S_k$ posts its encrypted message to said bulletin board substantially simultaneously.

30. An apparatus for anonymous message transfer as set forth in claim 22, where each sender $S_k$ constructs its encrypted message using said secret key of said first mixing center $C_1$ and including a signature of the respective sender $S_k$.

31. An apparatus for anonymous message transfer as set forth in claim 21, where each sender constructs an encrypted message which is publicly revealed after said first mixing center $C_1$ receives a respective encrypted message.

32. An apparatus for anonymous message transfer as set forth in claim 21, said first mixing center $C_1$ processing only legitimate messages and processing only one message from each sender.

33. An apparatus for anonymous message transfer as set forth in claim 32, where said senders are voters and said messages are votes.

34. An apparatus for anonymous message transfer as set forth in claim 33, where said result comprises a tally.

* * * * *